HIGH VOLTAGE CONTROL IN TELEVISION RECEIVERS

Filed Aug. 24, 1953

John Forrest Bigelow
Inventor
By Jack M. Wiseman
Attorney

United States Patent Office 2,790,108

Patented Apr. 23, 1957

2,790,108

HIGH VOLTAGE CONTROL IN TELEVISION RECEIVERS

John F. Bigelow, Riverside, Ill., assignor to Raytheon Manufacturing Company, Waltham, Mass., a corporation of Delaware Application August 24, 1953, Serial No. 376,129

12 Claims. (Cl. 315—27)

Figures 1, 2:
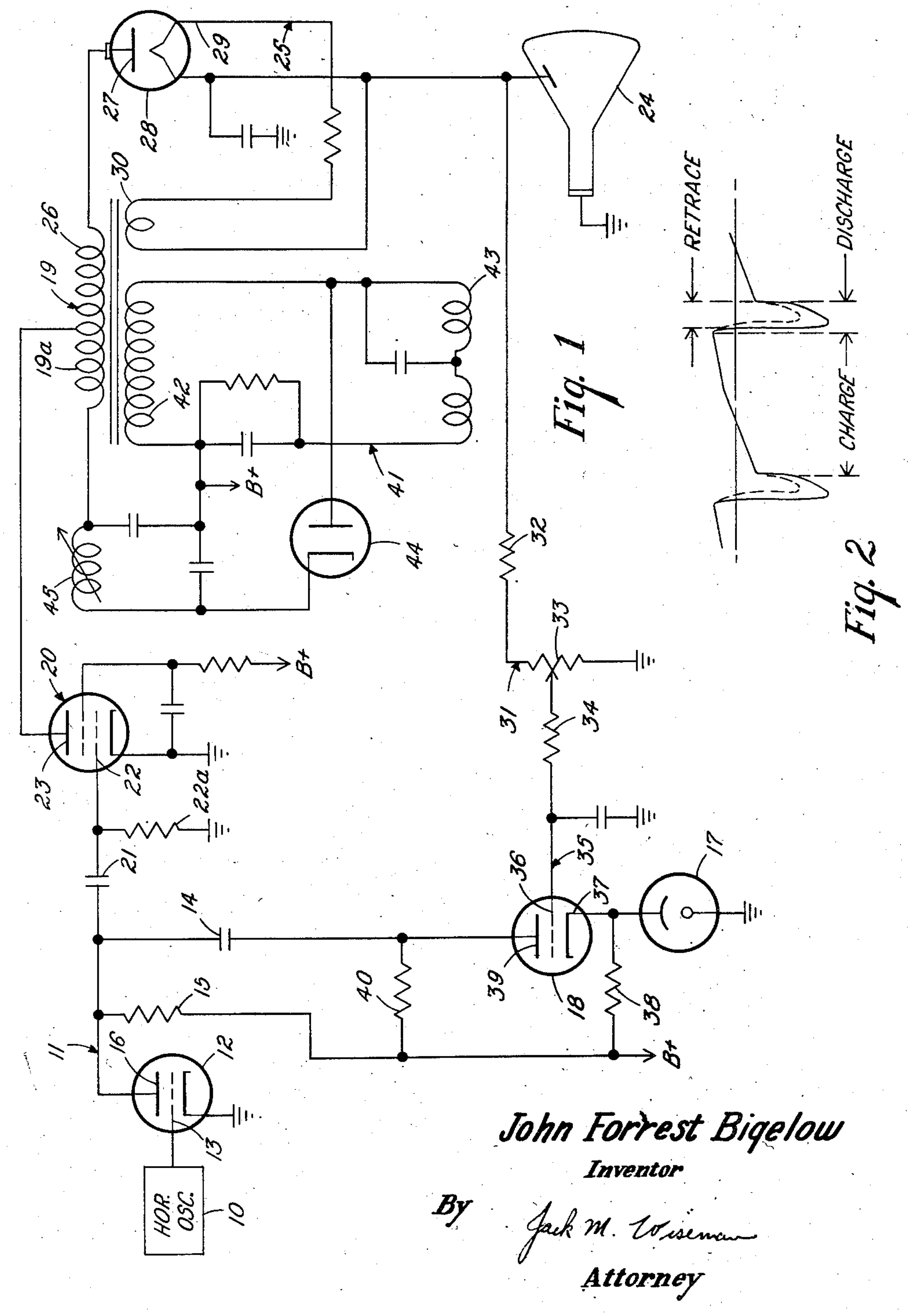

The present invention relates in general to high voltage control circuits, and more particularly to a high voltage control circuit for television picture tubes.

In color television receivers, a "losser" type voltage regulation system for the high voltage on picture tubes has been used, which utilizes a beam power tube as a dummy load. When the beam current in the picture tube goes to zero, the high voltage rises to a maximum. Thus, the beam power tube, as a dummy load, changes its characteristics with high voltage to keep the overall load on a high voltage transformer, during retrace, constant. Accordingly, as less load is placed on the high voltage transformer through a rectifier tube, more load is placed on the high voltage transformer through the beam power tube.

Accordingly, an important object of the present invention is to provide a high voltage control circuit which is economical to manufacture, without sacrificing performance, by eliminating the use of a beam power tube.

Another object of the present invention is to provide a high voltage control circuit which is more efficient by controlling the high voltage generated within the power supply rather than controlling variable loss through a dummy load in the power supply.

Other objects and features will appear upon further perusal of the detailed description taken in conjunction with the accompanying drawing, in which:

Fig. 1 is a schematic diagram of the high voltage control circuit embodied in the present invention; and Fig. 2 is a diagrammatic sketch of a sweep drive signal as applied to a switching circuit.

Briefly described, a suitable source of energy is produced by a generator, which, in the preferred embodiment, is a horizontal sweep pulse oscillator.

For producing sweep and high voltage signals, a suitable discharge circuit is provided comprising a discharge tube and a resistance-capacitance network. The discharge tube is biased to plate current cut-off, and, during the non-conducting period thereof, a storage condenser of the resistance-capacitance network charges to produce the charge portion of the sweep drive signal. As the discharge tube conducts, the storage condenser discharges to produce the discharge portion of the sweep drive signal. The conduction of the discharge tube is controlled by the pulses produced by the horizontal sweep pulse oscillator.

In order to control the current flow to a high voltage transformer, a switching circuit is provided. The switching circuit receives the sweep drive signal which is applied from the discharge circuit. During the positive portion of the sweep drive signal, a switching tube in the switching circuit conducts to control the induced voltage in a secondary winding of the high voltage transformer. During the period of time that the sweep drive signal is negative, the switching tube does not conduct, and a portion of this period of time is known as the retrace period.

For rectifying the high voltage induced in the secondary winding of the high voltage transformer, a conventional rectifying circuit in a power supply circuit is provided. In the preferred embodiment, a conventional picture tube for television receivers is connected to the output of the power supply circuit.

For regulating the output voltage of the power supply, an automatic regulating circuit is provided, comprising a voltage control tube and a feedback or bleeder circuit. The feedback or bleeder circuit is connected to the output of the power supply and to the grid of the voltage control tube. The output of the voltage control tube is connected to the resistance-capacitance network of the discharge circuit. As the output voltage of the power supply circuit varies, the direct current voltage applied to the grid of the voltage control tube varies directly therewith.

Accordingly, the voltage control tube is in the discharge circuit of the storage condenser. As a result thereof, as the grid of the voltage control tube becomes more positive, the discharge portion of the sweep drive signal has a lesser amplitude. Consequently, the rate of change in voltage with respect to time of the positive portion of the discharge portion decreases. Thus, the voltage induced in the secondary winding of the high voltage transformer decreases. Conversely, as the grid of the voltage control tube becomes less positive, the discharge portion of the sweep drive signal has a greater amplitude. Consequently, the rate of change in voltage with respect to time of the positive portion of the discharge portion increases. Thus, the voltage induced in the secondary winding of the high voltage transformer increases.

Referring now to Figs. 1 and 2, a suitable source of pulse energy is produced by a generator 10, which, in the preferred embodiment, is a horizontal sweep oscillator.

For producing a sweep drive voltage, as shown in Fig. 2, a suitable discharge circuit 11 is provided comprising a conventional triode tube 12, designated discharge tube. The discharge tube 12 has a grid 13 thereof connected to the output of the horizontal sweep oscillator 10.

Included within the discharge circuit 11 is a resistance-capacitance network comprising storage condenser 14 and a charging resistor 15. The discharge tube 12 is biased to plate current cut-off. While the discharge tube 12 is non-conducting, the storage condenser 14 charges in series with resistor 15 to produce the charge portion of the sweep drive signal, since there is a potential difference across resistor 40. The potential difference across resistor 40 is produced by the current flow through tube 18.

As a positive pulse is fed to the discharge tube 12 from the generator 10, discharge tube 12 conducts. As a result thereof, storage condenser 14 discharges, to produce the discharge portion of the sweep drive signal, through the tube 12 to ground and returning to condenser 14 over a network comprising resistor 40, tube 18, tube 17 and B+. The sweep drive signal, as it appears across grid resistor 22*a*, is shown in Fig. 2.

It is to be noted that the sweep drive signal is a sawtooth waveform having a negative pulse superimposed thereon. The sawtooth portion is produced by the condenser 14, and the negative pulse is produced by the resistor 40 and the plate-cathode resistance of tube 18. The point marked B+, common to resistors 15, 38 and 40, is at A. C. ground potential, because of the low internal impedance inherent in a B+ power supply. The cathode of tube 18 is at ground because of the characteristics of tube 17, which appears to an A. C. signal as a large condenser. In view of the foregoing, tube 18 is in parallel with resistor 40 for A. C. signals.

It is to be further noted that the voltage control tube 18 does not appreciably affect the effective resistance of the charge resistance-capacitance network because of the relatively large value of the resistor 15, which is approximately 250,000 ohms. However, it does appreciably affect the effective resistance of the discharge resistance-capacitance network because of the relatively small value of the resistor 40, which is approximately 27,000 ohms, and the small plate-to-cathode resistance of the voltage control tube 18.

In order to control current flow to and induce high voltages in a high voltage transformer 19, a suitable switching circuit 20 is provided comprising a suitable pentode tube 20, designated switching tube. The control grid 22 of the switching tube 20 is connected to a blocking condenser 21, which in turn is connected to the storage condenser 14, charging resistor 15 and the plate 16 of the discharge tube 12. The switching tube 20 has the plate 23 thereof connected to the primary winding 19*a* of the high voltage transformer 19. The switching tube 20 is biased so as to conduct only during the positive portion of the sweep drive signal, drawing its plate current through the primary winding 19*a*. The period of time in which the switching tube 20 changes from a state of conduction to one of non-conduction is a portion of the retrace time.

For providing direct current voltage to an output, which, in the preferred embodiment, is a picture tube 24, a conventional power supply circuit 25 is provided. The power supply circuit 25 comprises a second section 26 of the primary circuit of the high voltage transformer 19 which is connected to a plate 27 of a rectifier tube 28. The cathode 29 of the rectifier tube 28 is connected to a filament winding 30 of the high voltage transformer 19. The direct current plate voltage path for tube 20 is as follows: B+, winding 42, tube 44, coil 45, winding 19*a* and the plate of tube 20.

For regulating the voltage output of the power supply circuit 25 by controlling the voltage applied thereto, a voltage control circuit 35 is provided comprising a feedback or bleeder circuit 31 and the triode tube 18, designated voltage control tube. The feedback circuit 31 is connected to the output of the high voltage power supply through a dropping resistor 32 and comprises a variable resistor 33 and a resistor 34. The voltage control tube 18 has a grid 36 thereof connected to the feedback resistor 34 of the feedback circuit 31. A cathode 37 of the voltage control tube 18 is connected to the conventional constant voltage tube 17 and to B+ through a dropping resistor 38. The plate 39 of the voltage control tube 18 is connected to the storage condenser 14 and the plate current supply resistor 40 of the discharge circuit 11.

Accordingly, the voltage control tube 18 and resistor 40 are connected parallel in the discharge circuit of the storage condenser 14, and function to control the pulse portion of the discharge portion of the sweep drive signal, in a manner previously described.

As the voltage in the output of the power supply circuit 25 varies, the direct current voltage across the feedback circuit 31 varies directly therewith. Accordingly, as the voltage output of the power supply circuit 25 increases, the positive potential applied to grid 36 of the voltage control tube 18 increases. As a result thereof, the current flow through the tube 18 increases, causing the cathode-to-plate resistance of tube 18 to decrease. Consequently, the effective resistance of the parallel connection, resistor 40 and tube 18, decreases. Thus, the amplitude of the pulse portion of the discharge portion of the sweep drive signal decreases, as shown by dotted lines in Fig. 2. As a result thereof the discharge portion of the sweep drive signal, during the positive portion thereof, has a decreased rate of change with respect to time. Accordingly, the voltage induced in the secondary winding 26 of the high voltage transformer 19 decreases.

As the voltage output of the power supply circuit 25 decreases, the positive potential applied to the grid 36 of the voltage control tube 18 decreases. Consequently, the current flow through the tube 18 decreases, causing the cathode-to-plate resistance of tube 18 to increase. As a result thereof, the effective resistance of the parallel connection, resistor 40 and tube 18, increases. Thus, the amplitude of the pulse portion of the discharge portion of the sweep drive signal increases, as shown by solid lines in Fig. 2. Consequently, the discharge portion of the sweep drive signal, during the positive portion thereof, has an increased rate of change with respect to time. Accordingly, the voltage induced in the secondary winding 26 of the high voltage transformer 19 increases.

In the preferred embodiment, during the retrace period, scanning voltage for the picture tube 24 is provided by a horizontal sweep circuit 41. The horizontal sweep circuit comprises a secondary winding 42 of the high voltage transformer 19 to produce alternating current oscillations. Connected to the secondary winding 42 is a deflection yoke 43, which produces the magnetic scanning field for the picture tube 24. For damping the oscillations, a damping tube 44 is provided having the cathode thereof connected to a linearity coil 45.

It is understood that variations and modifications may be effected without departing from the scope of the appended claims.

I claim:

1. In a voltage control circuit, a generator providing a source of electrical energy, a discharge circuit responsive to said generator for producing a sweep drive signal, a power supply circuit comprising a high voltage transformer, an oscillation damping circuit linking the primary and secondary windings of said transformer, a switching circuit additional to and distinct from said oscillation damping circuit and responsive to said sweep drive signal for controlling the output voltage for said power supply circuit, and a voltage regulating circuit connected to said discharge circuit and responsive to variations of the output voltage of said transformer for varying said sweep drive signal, thereby regulating the output voltage of said power supply circuit.

2. In a voltage control circuit, a generator providing a source of electrical energy, a discharge circuit responsive to said generator for producing a sweep drive signal, a power supply circuit comprising a high voltage transformer, an energy deflection circuit adapted to be energized by way of said transformer, an oscillation reducing circuit forming an extension of said energy deflection circuit, a switching circuit additional to and distinct from said oscillation reducing circuit and responsive to said sweep drive signal for controlling the output voltage for said power supply circuit, a feedback circuit connected to the output of said transformer, and a voltage control tube interconnecting said discharge circuit and said feedback circuit and responsive to variations of output voltage of said transformer for varying said sweep drive signal, thereby providing voltage regulation for said power supply circuit.

3. In a voltage control circuit, a generator providing a source of electrical energy, a discharge circuit responsive to said generator for producing a sweep drive signal having a discharge portion thereof, a power supply circuit comprising primary and secondary transformer windings, an oscillation damping circuit linking said windings, a switching circuit additional to and distinct from said oscillation damping circuit and responsive to said sweep drive signal for controlling the output voltage of one of said transformer windings, a voltage regulating circuit having a feedback circuit connected to the output of said power supply circuit for providing a feedback voltage, and a voltage control tube in said voltage regulating circuit connected to said discharge circuit and responsive to variations of feedback voltage for varying the amplitude of the discharge portion of said voltage control signal for regulating the output voltage of said power supply circuit.

4. In a voltage control circuit, a generator providing a source of electrical energy, a discharge circuit responsive to said generator for producing a sweep drive signal, a discharge resistance-capacitance network in said discharge circuit providing a discharge portion for said sweep drive signal, a power supply circuit comprising a high voltage transformer, an energy deflection circuit adapted to be energized by way of said transformer, an oscillation damping circuit forming an extension of said energy deflection circuit, a switching circuit additional to and distinct from said oscillation damping circuit and responsive to said sweep drive signal for controlling the output voltage of said power supply circuit, a voltage regulating circuit having a feedback circuit independent of said energy deflection circuit, and a voltage control tube in said voltage regulating circuit connected to said discharge resistance-capacitance network and responsive to variations of feedback voltage for varying the effective resistance of said discharge resistance-capacitance network, thereby controlling the rate of change of the discharge portion of said voltage control signal for regulating the output voltage of said transformer.

5. In a voltage control circuit, a generator providing a source of electrical energy, a discharge circuit responsive to said generator for producing a sweep drive signal, a discharge resistance-capacitance network in said discharge circuit providing the discharge portion of said sweep drive signal, a power supply circuit comprising a high voltage transformer, an oscillation damping circuit including a portion of said transformer, a switching circuit additional to and distinct from said oscillation damping circuit and responsive to said sweep drive signal and connected to said high voltage transformer for varying the rate of change of magnetic flux in said transformer for controlling the output voltage of said power supply circuit, a feedback circuit connected to said power supply circuit for providing a feedback voltage, and a voltage control tube connected to said discharge resistance-capacitance network and responsive to variations of feedback voltage for varying the effective resistance of said discharge resistance-capacitance network, thereby varying the amplitude and rate of change of the discharge portion of said sweep drive signal in order to vary the rate of change of magnetic flux in said transformer to provide voltage regulation.

6. In a voltage control circuit, a horizontal oscillator for providing a series of pulses, a discharge circuit responsive to said series of pulses for producing a sweep drive signal, a charge resistance-capacitance network in said discharge circuit providing the charge portion of said sweep drive signal, a discharge resistance-capacitance network in said discharge circuit providing the discharge portion of said sweep drive signal, a switching circuit conductive in response to positive portions of said sweep drive signal comprising both the charge and discharge portion thereof and non-conducting during the negative portions of said sweep drive signal comprising both the charge and discharge portions thereof producing a retrace time during said non-conducting period, a power supply circuit providing a high voltage output voltage in response to rate of change of current flow from said switching circuit, a picture tube having the high voltage therefor supplied by said power supply circuit, an electron beam deflection circuit associated with said picture tube, a feedback circuit independent of said electron beam deflection circuit but connected to said power supply for providing a feedback voltage, and a voltage control tube connected to said discharge resistance-capacitance network and responsive to variations of feedback voltage for varying the effective resistance of said discharge resistance-capacitance network, thereby varying the amplitude and rate of change of the discharge portion of said sweep drive signal in order to regulate the output voltage of said power supply circuit.

7. In a voltage control circuit, a generator providing a source of electrical energy, a discharge circuit responsive to said generator for producing a sweep drive signal comprising a sawtooth signal having a negative pulse superimposed thereon, a power supply circuit comprising a high voltage transformer, an oscillation damping circuit including a portion of said transformer, a switching circuit additional to and distinct from said oscillation damping circuit and responsive to said sweep drive signal for controlling the output voltage for said power supply circuit, and a voltage regulating circuit connected to said discharge circuit and responsive to variations of the output voltage of said power supply circuit for varying the negative pulse of said sweep drive signal, thereby regulating the output voltage of said power supply circuit.

8. In a voltage control circuit, a generator providing a source of electrical energy, a discharge circuit responsive to said generator for producing a sweep drive signal comprising a sawtooth waveform having a negative pulse superimposed thereon, a discharge resistance-capacitance network in said discharge circuit providing a discharge portion and negative pulse for said sweep drive signal, a power supply circuit comprising primary and secondary transformer windings, an oscillation damping circuit linking said primary and secondary windings, a switching circuit additional to and distinct from said oscillation damping circuit and circuit responsive to said sweep drive signal for controlling the output voltage of said power supply circuit, a voltage regulating circuit having a feedback circuit connected to the output of said power supply circuit, and a voltage control tube in said voltage regulating circuit connected to said discharge resistance-capacitance network and responsive to variations of feedback voltage for varying the amplitude of said negative pulse produced by said discharge resistance-capacitance network, thereby controlling the rate of change of the discharge portion of said voltage control signal for regulating the output voltage of said power supply circuit.

9. In a voltage control circuit for a load whose operation requires the delivery of sweep drive signals thereto, the combination with said load of a generator providing a source of electrical energy for said sweep drive signals, means including a discharge tube and an R-C network responsive to operation of said generator to regulate the transmission of said sweep drive signals, a power supply-controlling switch tube having its plate circuit leading to said load to be energized, and also having its control grid responsive to the values prevailing in said R-C network, a voltage regulating tube having its plate circuit included within said R-C network, and its grid circuit distinct from that of said discharge tube, and means to vary the excitation voltage of said voltage regulating tube grid circuit in accordance with variations in the amount of power delivered to said load.

10. In a voltage control circuit for a load whose operation requires the delivery of sweep drive signals thereto, the combination with said load of means including an R-C network for regulating the delivery of said sweep drive signals to said load, a source of operating power for said load, means including a switch tube controlling delivery of said operating power to said load, and means for controlling the excitation voltage applied to said switch tube, said means including a voltage regulating tube having its grid-cathode circuit across said load and responsive solely thereto, and having its plate circuit included within said R-C network.

11. In a voltage controlling circuit, a generator providing a source of electrical energy, a discharge circuit including a discharge tube and an R-C network responsive to said generator for producing a sweep drive signal, a voltage regulating tube having its plate circuit directly connected with said R-C network, and its grid circuit distinct from said discharge circuit, a power supply-controlling switch tube having a plate circuit leading to a load to be energized, and also having a control grid responsive to the R-C characteristics of said network, means for storing energy in said R-C network between successive conducting periods of said discharge tube, and means for controlling the magnitude of the stored energy charge in accordance with the excitation voltage applied to said control grid.

12. In a voltage control circuit, a generator providing a source of electrical energy, a discharge circuit including an R-C network responsive to said generator for producing a sweep drive signal for control of a utilization device, a voltage regulating tube having its plate circuit directly connected with said R-C network, and means to vary the excitation voltage applied to said voltage regulating tube solely in accordance with variations in the amount of power delivered to said utilization device.

References Cited in the file of this patent

UNITED STATES PATENTS

| | | |
|---|---|---|
| 2,574,732 | Denton | Nov. 13, 1951 |
| 2,587,313 | Grundmann | Feb. 26, 1952 |
| 2,654,855 | Denton | Oct. 6, 1953 |
| 2,657,333 | Haantjes et al. | Oct. 27, 1953 |